United States Patent
Ahn et al.

(10) Patent No.: US 11,705,552 B2
(45) Date of Patent: Jul. 18, 2023

(54) NEGATIVE ACTIVE MATERIAL FOR RECHARGEABLE LITHIUM BATTERY AND RECHARGEABLE LITHIUM BATTERY INCLUDING SAME

(71) Applicant: Samsung SDI Co., Ltd., Yongin-si (KR)

(72) Inventors: Ji Woo Ahn, Yongin-si (KR); Dongwoo Kim, Yongin-si (KR); Jaehou Nah, Yongin-si (KR); Bumjin Chang, Yongin-si (KR); Yurim Cha, Yongin-si (KR); Yeonjoo Choi, Yongin-si (KR); Ilyoung Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 55 days.

(21) Appl. No.: 16/312,972

(22) PCT Filed: Jul. 10, 2017

(86) PCT No.: PCT/KR2017/007348
§ 371 (c)(1),
(2) Date: Dec. 21, 2018

(87) PCT Pub. No.: WO2018/012821
PCT Pub. Date: Jan. 18, 2018

(65) Prior Publication Data
US 2019/0229325 A1    Jul. 25, 2019

(30) Foreign Application Priority Data
Jul. 13, 2016    (KR) .................. 10-2016-0088888

(51) Int. Cl.
*H01M 4/133* (2010.01)
*H01M 4/36* (2006.01)
(Continued)

(52) U.S. Cl.
CPC .......... *H01M 4/133* (2013.01); *H01M 4/366* (2013.01); *H01M 4/386* (2013.01); *H01M 4/387* (2013.01); *H01M 4/587* (2013.01)

(58) Field of Classification Search
CPC ...................................................... H01M 4/133
See application file for complete search history.

(56) References Cited

U.S. PATENT DOCUMENTS

| 6,344,296 B1 | 2/2002 | Ishii et al. |
| 2001/0033822 A1 | 10/2001 | Ishii et al. |

(Continued)

FOREIGN PATENT DOCUMENTS

| CN | 100350653 C | 11/2007 |
| CN | 100435405 C | 11/2008 |

(Continued)

OTHER PUBLICATIONS

KR20120138855A Translation from Espacenet (Year: 2012).*
(Continued)

*Primary Examiner* — Nathanael T Zemui
(74) *Attorney, Agent, or Firm* — Lewis Roca Rothgerber Christie LLP

(57) ABSTRACT

A negative active material for a rechargeable lithium battery and a rechargeable lithium battery including the same are disclosed, and the negative active material includes a primary particle of a crystalline carbon-based material and secondary particle that is an assembly of the primary particles, wherein a ratio of an average particle diameter (D50) of the secondary particle relative to an average particle diameter (D50) of the primary particle (average particle diameter (D50) of the secondary particle/average particle diameter (D50) of the primary particle) ranges from about 1.5 to about 5 and an aspect ratio of the primary particle ranges from about 1 to about 7.

6 Claims, 2 Drawing Sheets

(51) Int. Cl.
  *H01M 4/38* (2006.01)
  *H01M 4/587* (2010.01)

(56) References Cited

U.S. PATENT DOCUMENTS

| | | |
|---|---|---|
| 2002/0006376 A1 | 1/2002 | Ishii et al. |
| 2005/0221185 A1* | 10/2005 | Sakata .................. H01M 4/133 429/231.8 |
| 2014/0050983 A1 | 2/2014 | Kim et al. |
| 2014/0231707 A1* | 8/2014 | Sudoh .................. H01M 4/587 252/182.1 |
| 2015/0318545 A1* | 11/2015 | Satow .................. H01M 4/366 429/324 |
| 2016/0276657 A1* | 9/2016 | Song ..................... H01M 4/625 |
| 2017/0110729 A1* | 4/2017 | Tsuchiya ............... H01M 4/587 |
| 2017/0352871 A1* | 12/2017 | Kim .................. H01M 10/0525 |
| 2018/0190985 A1* | 7/2018 | Choi ..................... H01M 4/364 |

FOREIGN PATENT DOCUMENTS

| | | |
|---|---|---|
| CN | 103328378 A | 9/2013 |
| CN | 107885261 A | 9/2015 |
| JP | 2004-247245 A | 9/2004 |
| JP | 2007-173156 A | 7/2007 |
| JP | 2012-212561 A | 11/2012 |
| KR | 2003-0097608 A | 12/2003 |
| KR | 10-2012-0138855 A | 12/2012 |
| KR | 10-2014-0022682 A | 2/2014 |
| KR | 10-2016-0014539 A | 2/2016 |
| KR | 10-2017-0048210 A | 5/2017 |
| WO | WO 2016/018023 A1 | 2/2016 |

OTHER PUBLICATIONS

Korean Intellectual Property Office Action for corresponding Korean Patent Application No. 10-2016-0088888, dated Aug. 6, 2020, 6 pages.
Chunqi Wang, Theory and Practice of Cast Iron Inoculation, Mar. 31, 1991, pp. 22-24, Tianjin University Press.
Chinese Office Action and Search Report dated Apr. 22, 2021 for Patent Application No. 201780042889.1, with machine English translation, 14 pages.
Chunqi Wang, Translation of Theory and Practice of Cast Iron Inoculation, Mar. 31, 1991, 6 Pages, Tianjin University Press.
Chinese Office Action dated Sep. 17, 2021, for Application No. 201780042889.1, and corresponding machine English translation, 6 pages.
Chinese Office Action dated Jan. 10, 2022, issued in Patent Application No. 201780042889.1, and English Translation, 11 pages.
Chinese Office Action ("Decision of Reexamination") dated Jan. 4, 2023, for corresponding Application No. 201780042889.1, including English translation, 21 pages.
Chinese Notification of Reexamination dated Aug. 12, 2022, of the corresponding Chinese Application No. 201780042889.1, with corresponding English translation, 11 pages.

* cited by examiner

[Fig. 1]
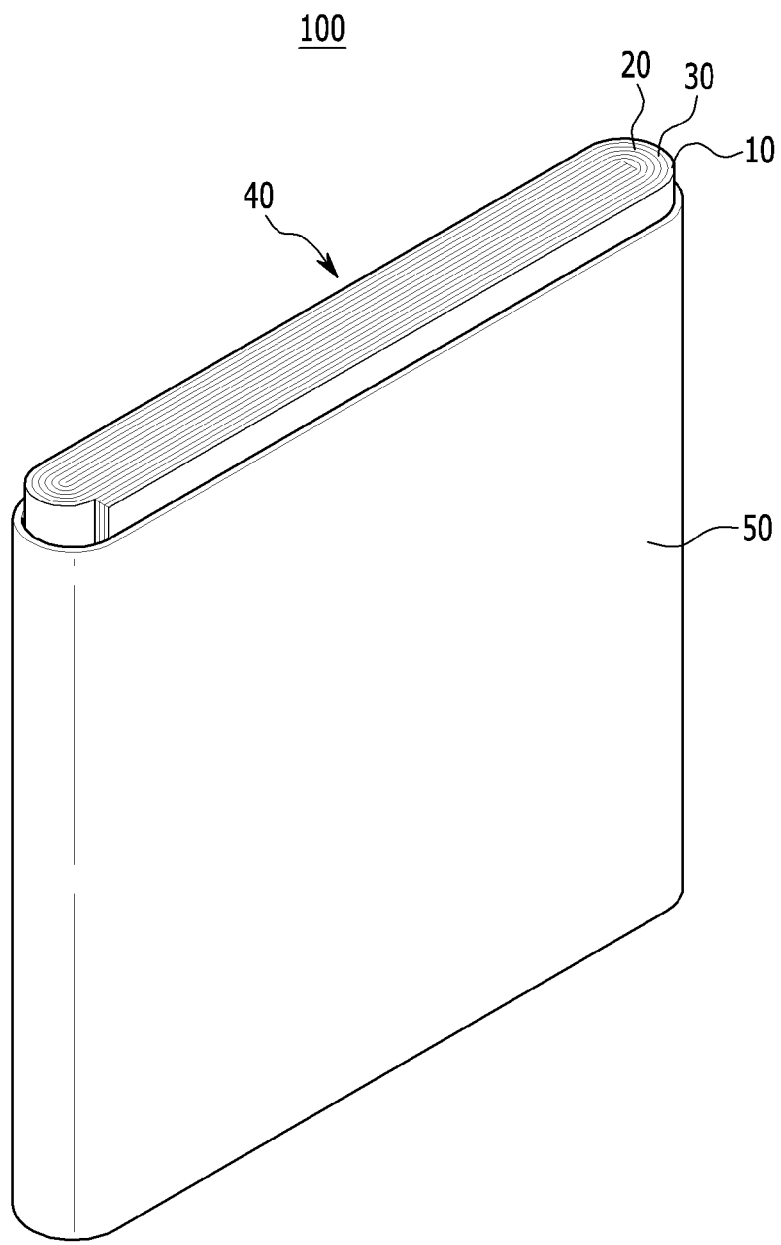

[Fig. 2]
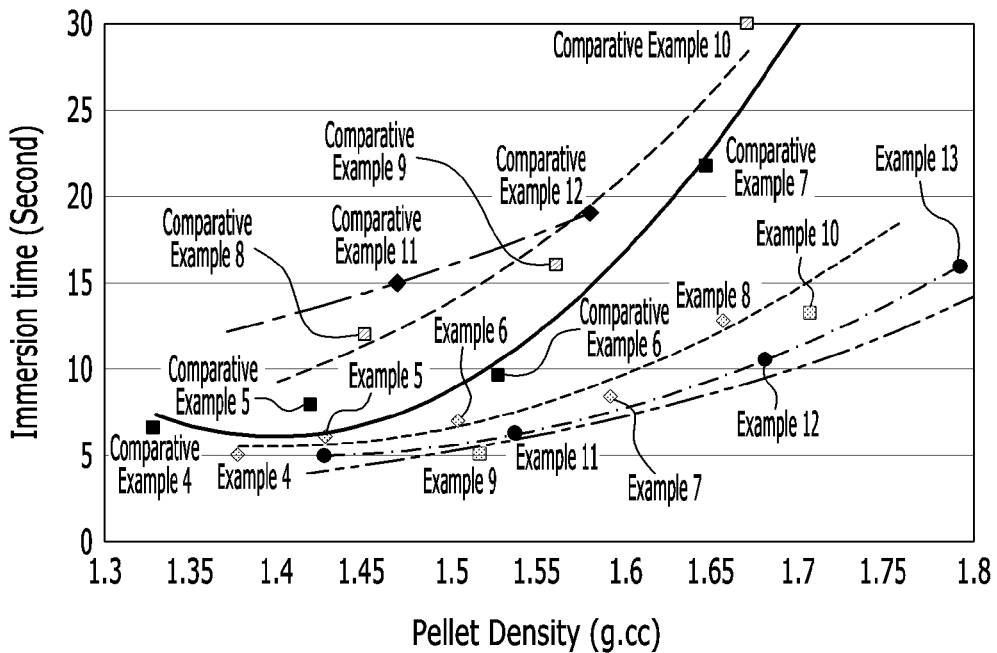
[Fig. 3]
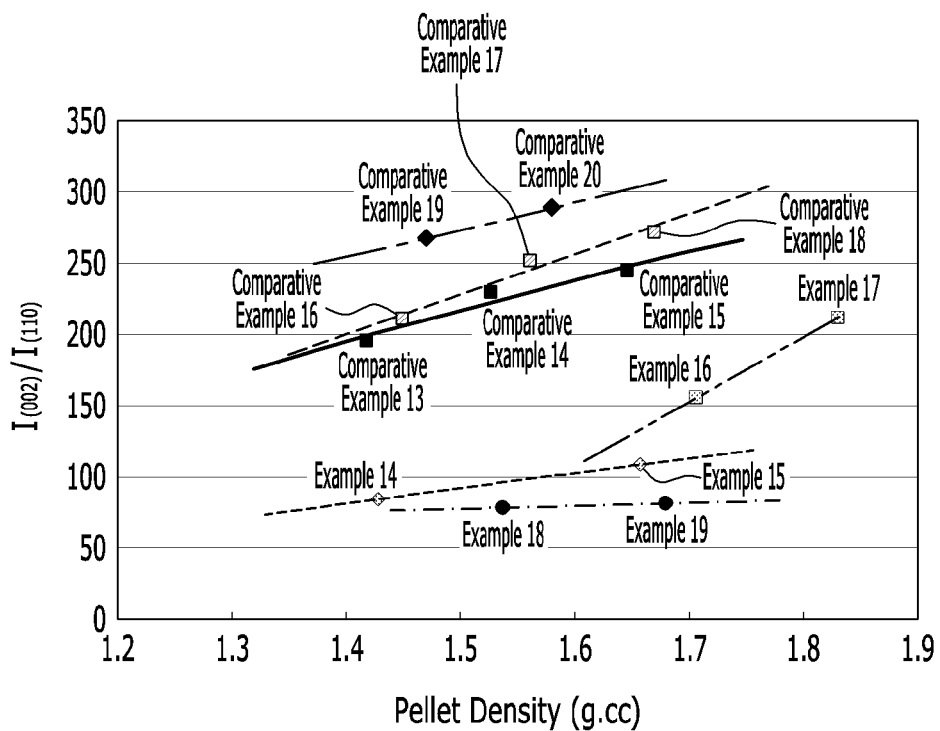

NEGATIVE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATION(S)

This application is a National Phase Patent Application of International Patent Application Number PCT/KR2017/007348, filed on Jul. 10, 2017, which claims priority of Korean Patent Application No. 10-2016-0088888, filed Jul. 13, 2016. The entire contents of both of which are incorporated herein by reference.

TECHNICAL FIELD

A negative active material for a rechargeable lithium battery and a rechargeable lithium battery including the same are disclosed.

BACKGROUND ART

A portable information device or an electric vehicle such as a cell phone, a laptop, smart phone, and the like has used a rechargeable lithium battery as a driving power source.

The rechargeable lithium battery includes a positive electrode, a negative electrode, and an electrolyte. As for a positive active material of the positive electrode, an oxide consisting of lithium and transition metals and having a structure capable of intercalating lithium ions, such as $LiCoO_2$, $LiMn_2O_4$, and $LiNi_{1-x}Co_xO_2$ (0<x<1) has been used.

As for a negative active material, various carbon-based materials such as artificial graphite, natural graphite, and hard carbon, which intercalate and deintercalate lithium ions have been used.

Recently, mobile information terminal devices have been rapidly down-sized and lightened, and thus the rechargeable lithium battery used as its driving power source has been required of higher capacity and also of a cordless charge and a short charge time. Particularly, the short charge time is the most required, for a long charge time is complained as the most inconvenience by users.

DISCLOSURE OF INVENTION

Technical Problem

An embodiment provides a negative active material for a rechargeable lithium battery having improved charge rate capability and discharge rate capability.

Another embodiment provides a rechargeable lithium battery including the negative active material.

Solution to Problem

An embodiment provides a negative active material for a rechargeable lithium battery including a primary particle of a crystalline carbon-based material and a secondary particle that is an assembly of the primary particles, wherein a ratio of an average particle diameter (D50) of the secondary particle relative to an average particle diameter (D50) of the primary particle (average particle diameter (D50) of the secondary particle/average particle diameter (D50) of the primary particle) ranges from about 1.5 to about 5, and an aspect ratio of the primary particle ranges from about 1 to about 7.

The average particle diameter (D50) of the primary particle may range from about 3 μm to about 10 μm, for example about 5 μm to about 10 μm.

The average particle diameter (D50) of the secondary particle may range from about 10 μm to about 25 μm.

The crystalline carbon-based material may be artificial graphite, natural graphite, or a combination thereof. According to another embodiment, the crystalline carbon-based material may be artificial graphite, for example needle-cokes type or mosaic-cokes type artificial graphite.

In an X-ray diffraction pattern of the negative active material, $I_{(002)}/I_{(110)}$ that is a ratio of X-ray diffraction intensities at a (002) plane and a (110) plane may range from about 50 to about 270.

The negative active material may further include a Si-based or Sn-based material.

In an X-ray diffraction pattern of the negative active material, the $I_{(002)}/I_{(110)}$, that is, a ratio of X-ray diffraction intensities at a (002) plane and a (110) plane and the pellet density of the negative active material may have a relationship of Equation 1.

$$29 \leq [I_{(002)}/I_{(110)})\text{pellet density (cc/g)}] \leq 140 \qquad [\text{Equation 1}]$$

Another embodiment provides a rechargeable lithium battery including a negative electrode including the negative active material; a positive electrode including a positive active material; and an electrolyte.

Other embodiments are included in the following detailed description.

Advantageous Effects of Invention

The negative active material for a rechargeable lithium battery according to an embodiment may show excellent impregnation of an electrolyte, charge and discharge rate capability and particularly, high-rate charge and discharge characteristics.

BRIEF DESCRIPTION OF DRAWINGS

FIG. 1 is a schematic view showing a structure of a positive active material according to an embodiment.

FIG. 2 is a graph showing electrolyte impregnation characteristics of slurry pellet of Examples 4 to 13 and Comparative Examples 4 to 12.

FIG. 3 is a graph showing X-ray diffraction characteristics of powder pellets of Examples 14 to 19 and Comparative Examples 13 to 20.

BEST MODE FOR CARRYING OUT THE INVENTION

Hereinafter, embodiments are described in detail. However, these embodiments are exemplary, and this disclosure is not limited thereto.

A negative active material for a rechargeable lithium battery according to an embodiment includes a primary particle of a crystalline carbon-based material and a secondary particle that is an assembly of the primary particles.

As used herein, when a definition is not otherwise provided, an average particle diameter (D50) indicates a diameter of a particle where an accumulated volume is about 50 volume % in a particle distribution.

A ratio of an average particle diameter (D50) of the secondary particle relative to an average particle diameter (D50) of the primary particle, that is an average particle diameter (D50) of the secondary particle/an average particle diameter (D50) of the primary particle ranges from about 1.5 to about 5. When the ratio of an average particle diameter (D50) of the secondary particle/an average particle diameter (D50) of the primary particle is in a range of about 1.5 to about 5, excellent random-orientation may be obtained. In other words, when disorderness increases due to the increases in random-orientation, lithium ions may be easily intercalated in the negative active material during the charge.

An aspect ratio of the primary particle may range from about 1 to about 7, for example about 1 to about 5.

When the aspect of the primary particle is out of about 1 to about 7, random-orientation of the negative active material is reduced and thus rate capability may be deteriorated.

In this way, the negative active material according to an embodiment has the average particle diameter (D50) of the secondary particle/the average particle diameter (D50) of the primary particle ranging from about 1.5 to about 5, and has an average aspect ratio of the primary particle ranging from about 1 to about 7. By controlling the average particle diameter (D50) of the secondary particle/the average particle diameter (D50) of the primary particle and the aspect ratio of the primary particle within the ranges, disordering of particles increases, impregnation properties of an electrolyte may be improved, and charge and discharge characteristics are improved, and thus excellent charge and discharge characteristics may be realized. Swelling characteristics of the negative active material may be improved.

When at least either one of the ratio of an average particle diameter (D50) of the secondary particle/an average particle diameter (D50) of the primary particle or the aspect ratio of the primary particle does not satisfy the ranges, electrolyte impregnation and random-orientation are reduced, and thus the negative active material is inappropriate in terms of rate capability.

The average particle diameter (D50) of the primary particle may range from about 3 μm to about 10 μm, for example about 5 μm to about 10 μm. When the average particle diameter (D50) of the primary particle is out of the ranges, random-orientation and electrolyte impregnation are deteriorated, and thus rate capability is deteriorated.

The average particle diameter (D50) of the secondary particle may range from about 10 μm to about 25 μm. When the ratio of the average particle diameter (D50) of the secondary particle is out of the range, random-orientation and electrolyte impregnation are deteriorated, and thus rate capability is deteriorated.

The crystalline carbon-based material may be artificial graphite, natural graphite, or a combination thereof. According to another embodiment, the crystalline carbon-based material may be artificial graphite, for example, needle-cokes type or mosaic-cokes type artificial graphite. When the crystalline carbon-based material is artificial graphite and particularly, needle-cokes type artificial graphite or mosaic-cokes type artificial graphite, higher charge and discharge capacity may be obtained. The needle-cokes type artificial graphite indicates artificial graphite prepared by heat-treating needle cokes for graphitization, and the mosaic-cokes type artificial graphite indicates artificial graphite prepared by heat-treating mosaic cokes for graphitization.

In addition, the negative active material may further include a Si-based or Sn-based material. When the Si-based or Sn-based material is further included, the crystalline carbon-based material and the Si-based or Sn-based material may be mixed in a weight ratio of about 99.9:0.1 to about 20:80. When the crystalline carbon-based material is mixed with the Si-based or Sn-based material within the range, the shortcomings related to an expansion of the negative active material caused by further including the Si-based or Sn-based material in the negative active material but much improve battery charge and discharge efficiency and thus much increase a cycle life.

The Si-based or Sn-based material may include Si, a Si—C composite, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition element, a rare earth element, and a combination thereof, and not Si), Sn, $SnO_2$, a Sn—R alloy (wherein R is an element selected from an alkali metal, an alkaline-earth metal, a Group 13 element, a Group 14 element, a Group 15 element, a Group 16 element, a transition element, a rare earth element, and a combination thereof, and not Sn), and the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

In an X-ray diffraction pattern of the negative active material, $I_{(002)}/I_{(110)}$ that is a ratio of X-ray diffraction intensities at a (002) plane and a (110) plane may range from about 50 to about 270, for example about 50 to about 230. The X-ray diffraction pattern may be measured by using a CuKα ray, unless there is a particular limit. In addition, a peak intensity ratio indicates a peak height ratio.

Particularly, when the ratio ($I_{(002)}/I_{(110)}$) of X-ray diffraction intensities at the (002) and (110) planes is adjusted according to the pellet density of the negative active material, more appropriate properties depending on the pellet density may be obtained by figuring out a tendency depending on the pellet density. The appropriate ratio of X-ray diffraction intensities at the (002) and (110) planes and the $I_{(002)}/I_{(110)}$)]/pellet density may have relationship represented by Equation 1.

$$29 \leq [(I_{(002)}/I_{(110)})/\text{pellet density (cc/g)}] \leq 140 \quad \text{[Equation 1]}$$

According to an embodiment, the ($I_{(002)}/I_{(110)}$)/pellet density may be in a range of about 29 to about 125.

The pellet density may be slurry pellet density. The slurry pellet is prepared by mixing an active material and a binder in a solvent to prepare negative active material slurry and then, drying and grinding the slurry and applying a predetermined pressure to the powder, which is well known in a related art and easily understood by a person having an ordinary skill in the art even though not illustrated in detail. The negative active material slurry may be prepared by further adding a conductive material.

When the negative active material according to an embodiment has X-ray diffraction characteristics within the range, random orientation may be improved.

This negative active material according to an embodiment may be prepared in a common preparation process widely known in a related art, which will be illustrated in brief.

A primary particle is prepared. The primary particle has an average particle diameter (D50) of the primary particle ranging from about 3 μm to about 10 μm, for example about 5 μm to about 10 μm. The primary particle may be a crystalline carbon-based material.

The primary particles and a binder are mixed and agglomerated to form a secondary particle.

A ratio of the average particle diameter (D50) of the formed secondary particle relative to the average particle diameter (D50) of the primary particle primary particle may range from about 1.5 to about 5 (i.e., the average particle diameter (D50) of the secondary particle/the average particle diameter (D50) of the primary particle may range from about 1.5 to about 5). The average particle diameter (D50) of the secondary particle may range from about 10 μm to about 25 μm.

The binder may be coal pitch or petroleum pitch. The primary particles and the binder may be mixed in a weight ratio of about 5:5 to about 9.9:0.1. When the primary particles and the binder are mixed within the range, the secondary particle may have a desired average particle diameter (D50).

The mixing and agglomerating process may be performed under a common condition of forming a secondary particle by using primary particles.

Another embodiment of the present invention provides a rechargeable lithium battery including a negative electrode including the negative active material, a positive electrode including a positive active material, and an electrolyte.

The negative electrode includes a negative active material layer including the negative active material and a current collector supporting the negative active material.

In the negative active material layer, the negative active material may be included in an amount of about 95 wt % to about 99 wt % based on the total weight of the negative active material layer.

In an embodiment, the negative active material layer includes a binder, and optionally a conductive material. The negative active material layer may include about 1 wt % to about 5 wt % of a binder based on the total weight of the negative active material layer. When the negative active material layer includes a conductive material, the negative active material layer includes about 90 wt % to about 98 wt % of the negative active material, about 1 wt % to about 5 wt % of the binder, and about 1 wt % to about 5 wt % of the conductive material.

The binder improves binding properties of negative active material particles with one another and with a current collector. The binder includes a non-water-soluble binder, a water-soluble binder, or a combination thereof.

The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may include a rubber-based binder or a polymer resin binder. The rubber-based binder may be selected from a styrene-butadiene rubber, an acrylated styrene butadiene rubber (SBR), an acrylonitrile butadiene rubber, an acrylic rubber, a butyl rubber, a fluorine rubber, and a combination thereof. The polymer resin binder may be selected from polypropylene, an ethylenepropylene copolymer, polyepichlorohydrine, polyphosphazene, polyacrylonitrile, polystyrene, an ethylenepropylenediene copolymer, polyvinylpyridine, chlorosulfonated polyethylene, latex, a polyester resin, an acrylic resin, a phenol resin, an epoxy resin, polyvinyl alcohol, and a combination thereof.

When the water-soluble binder is used as a negative electrode binder, a cellulose-based compound may be further used as a thickener in order to provide viscosity. The cellulose-based compound includes one or more of carboxymethyl cellulose, hydroxypropylmethyl cellulose, methyl cellulose, or alkali metal salts thereof. The alkali metal may be Na, K, or Li. Such a thickener may be included in an amount of about 0.1 parts by weight to about 3 parts by weight based on 100 parts by weight of the negative active material.

The conductive material is included to provide electrode conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The positive electrode includes a positive active material layer, and a current collector supporting the positive active material. In the positive active material layer, an amount of the positive active material may be about 90 wt % to about 98 wt % based on the total weight of the positive active material layer.

In an embodiment, the positive active material layer may further include a binder and a conductive material. Herein, the binder and the conductive material may be included in an amount of about 1 wt % to about 5 wt %, respectively based on the total amount of the positive active material layer.

The positive active material may include lithiated intercalation compounds that reversibly intercalate and deintercalate lithium ions.

Specifically, one or more composite oxides of a metal selected from cobalt, manganese, nickel, and a combination thereof, and lithium may be used. More specifically, the compounds represented by one of the following chemical formulae may be used. $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0≤α≤2); $Li_aNi_{1-b-c}Co_bX_cO_{2-\alpha}T_\alpha$ (0.90≤a≤1.8, 0≤b≤0.5, 0≤c≤0.05, 0≤α<2); $Li_aNi_{1-b-c}Co_bX_cO_{2-\alpha}T_2$ (0.90≤a≤1.8, 0≤b≤0.5, 0≤c≤0.05, 0≤α<2); $Li_aNi_{1-b-c}Mn_bX_cD_\alpha$ (0.90≤a≤1.8, 0≤b≤0.5, 0≤c≤0.05, 0≤α≤2); $Li_aNi_{1-b-c}Mn_bX_cO_{2-\alpha}T_\alpha$ (0.90≤a≤1.8, 0≤b≤0.5, 0≤c≤0.05, 0≤α<2); $Li_aNi_{1-b-c}Mn_bX_cO_{2-\alpha}T_2$ (0.90≤a≤1.8, 0≤b≤0.5, 0≤c≤0.05, 0≤α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); and $Li_aFePO_4$ (0.90≤a≤1.8).

In the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method such as spray coating, dipping, and the like, but is not illustrated in more detail since it is well-known in the related field.

An amount of the positive active material may be about 90 wt % to about 98 wt % based on the total weight of the positive active material layer.

In an embodiment, the positive active material layer may include a binder and a conductive material. Herein, the binder and the conductive material may be included in an amount of about 1 wt % to about 5 wt %, respectively based on the total amount of the positive active material layer.

The binder improves binding properties of positive active material particles with one another and with a current collector. Examples thereof may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity. Any electrically conductive material may be used as a conductive material unless it causes a chemical change. Examples of the conductive material may be a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may be an aluminum foil, a nickel foil, or a combination thereof, but is not limited thereto.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. The ketone-based solvent includes cyclohexanone, and the like. The alcohol-based solvent include ethyl alcohol, isopropyl alcohol, and the like, and examples of the aprotic solvent include nitriles such as R—CN (where R is a C2 to C20 linear, branched, or cyclic hydrocarbon, and may include a double bond, an aromatic ring, or an ether bond), amides such as dimethylformamide, dioxolanes such as 1,3-dioxolane, sulfolanes, and the like.

The organic solvent may be used alone or in a mixture. When the organic solvent is used in a mixture, the mixture ratio may be controlled in accordance with a desirable battery performance.

The carbonate-based solvent may include a mixture with a cyclic carbonate and a linear carbonate. The cyclic carbonate and linear carbonate are mixed together in a volume ratio of about 1:1 to about 1:9. When the mixture is used as an electrolyte, it may have enhanced performance.

The organic solvent may further include an aromatic hydrocarbon-based solvent as well as the carbonate-based solvent. The carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 1.

[Chemical Formula 1]

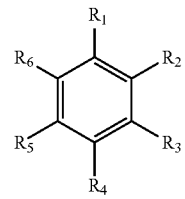

In Chemical Formula 1, $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate, an ethylene carbonate-based compound represented by Chemical Formula 2, or propanesultone to improve a cycle life.

[Chemical Formula 2]

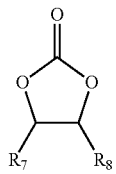

In Chemical Formula 2, $R_7$ and $R_8$ are the same or different and may be each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle life may be flexibly used within an appropriate range.

The lithium salt dissolved in an organic solvent supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, for example integers of 1 to 20), LiCl, LiI, and $LiB(C_2O_4)_2$ (lithium bis(oxalato) borate; LiBOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

FIG. 1 is an exploded perspective view showing a rechargeable lithium battery according to an embodiment. The rechargeable lithium battery according to an embodiment is illustrated as a prismatic battery but is not limited thereto and may include variously-shaped batteries such as a cylindrical battery, a pouch battery, and the like.

Referring to FIG. 1, a rechargeable lithium battery 100 according to an embodiment includes an electrode assembly 40 manufactured by winding a separator 30 interposed between a positive electrode 10 and a negative electrode 20, and a case 50 housing the electrode assembly 40. An electrolyte (not shown) may be impregnated in the positive electrode 10, the negative electrode 20, and the separator 30.

MODE FOR THE INVENTION

Hereinafter, examples of the present invention and comparative examples are described. These examples, however, are not in any sense to be interpreted as limiting the scope of the invention.

Example 1

A secondary particle negative active material having an average particle diameter (D50) of 20.5 μm was prepared by mixing primary particles formed of needle-cokes type artificial graphite and having an average particle diameter (D50) of 9.0 μm and an aspect ratio ranging from 1 to 5 with binder pitch in a weight ratio of 9:1 and agglomerating them. In the negative active material, a ratio of the average particle diameter (D50) of the secondary particle/the average particle diameter (D50) of the primary particle was 2.28.

Example 2

A secondary particle negative active material having an average particle diameter (D50) of 13.5 μm was prepared by mixing primary particles formed of needle-cokes type artificial graphite and having an average particle diameter (D50) of 5.0 μm and an aspect ratio ranging from 1 to 5 with binder pitch in a weight ratio of 8:2 and agglomerating them. In the negative active material, the average particle diameter (D50) of the secondary particle/the average particle diameter (D50) of the primary particle was 2.70.

Example 3

A secondary particle negative active material having an average particle diameter (D50) of 18.4 μm was prepared by mixing primary particles formed of needle-cokes type artificial graphite and having an average particle diameter (D50) of 9.0 μm and an aspect ratio ranging from 1 to 5 with binder pitch in a weight ratio of 9:1 and agglomerating them. In the negative active material, the average particle diameter (D50) of the secondary particle/the average particle diameter (D50) of the primary particle was 2.04.

Comparative Example 1

A secondary particle negative active material having an average particle diameter (D50) of 13.3 μm was prepared by mixing primary particles formed of needle-cokes type artificial graphite and having an average particle diameter (D50) of 9.0 μm and an aspect ratio ranging from 1 to 5 with binder pitch in a weight ratio of 9:1 and agglomerating them. In the negative active material, the average particle diameter (D50) of the secondary particle/the average particle diameter (D50) of the primary particle was 1.48.

Comparative Example 2

A secondary particle negative active material having an average particle diameter (D50) of 15.2 μm was prepared by mixing primary particles formed of needle-cokes type artificial graphite and having an average particle diameter (D50) of 12.0 μm and an aspect ratio ranging from 1 to 5 with binder pitch and agglomerating them. In the negative active material, the average particle diameter (D50) of the secondary particle/the average particle diameter (D50) of the primary particle was 1.27.

Comparative Example 3

A secondary particle negative active material having an average particle diameter (D50) of 18.0 μm was prepared by mixing primary particles formed of needle-cokes type artificial graphite and having an average particle diameter (D50) of 8.0 μm and an aspect ratio ranging from 8 to 9 with binder pitch and agglomerating them. In the negative active material, the average particle diameter (D50) of the secondary particle/the average particle diameter (D50) of the primary particle was 2.25.

Impregnation Experiment of Electrolyte Solution 97.5 wt % of each negative active material according to Examples 1 to 3 and Comparative Examples 1 to 3, 1.0 wt % of carboxymethyl cellulose, and 1.5 wt % of styrene-butadiene rubber were mixed in water of a solvent to prepare negative active material slurry. The slurry was pressed as shown in Table 1 to manufacture a slurry pellet consisting of the active material and a binder. Each slurry pellet was referred to be Examples 4 to 13 and Comparative Examples 4 to 12.

TABLE 1

| | Negative active material | Pressure (ton) | Slurry pellet density (g/cc) |
|---|---|---|---|
| Comparative Example 4 | Comparative Example 1 | 0.52 | 1.33 |
| Comparative Example 5 | Comparative Example 1 | 0.76 | 1.42 |
| Comparative Example 6 | Comparative Example 1 | 1.10 | 1.53 |
| Comparative Example 7 | Comparative Example 1 | 1.79 | 1.65 |
| Example 4 | Example 1 | 1.20 | 1.38 |
| Example 5 | Example 1 | 1.50 | 1.43 |
| Example 6 | Example 1 | 2.00 | 1.50 |
| Example 7 | Example 1 | 3.00 | 1.59 |
| Example 8 | Example 1 | 4.60 | 1.66 |
| Example 9 | Example 2 | 2.00 | 1.52 |
| Example 10 | Example 2 | 3.00 | 1.71 |
| Example 11 | Example 3 | 1.00 | 1.54 |
| Example 12 | Example 3 | 1.50 | 1.68 |
| Example 13 | Example 3 | 2.00 | 1.79 |
| Comparative Example 8 | Comparative Example 2 | 0.75 | 1.45 |
| Comparative Example 9 | Comparative Example 2 | 1.00 | 1.56 |
| Comparative Example 10 | Comparative Example 2 | 1.50 | 1.67 |
| Comparative Example 11 | Comparative Example 3 | 0.75 | 1.47 |
| Comparative Example 12 | Comparative Example 3 | 1.00 | 1.58 |

Subsequently, 50 μℓ of an electrolyte solution prepared by dissolving 1 M LiPF$_6$ in a mixed solvent of ethylene carbonate and dimethyl carbonate (3:7 of a volume ratio) was carefully added in a dropwise fashion on the pellets and then covered to prevent an evaporation, and time taken until the electrolyte solution was completely impregnated was measured. The results are shown in FIG. 2.

As shown in FIG. 2, the slurry pellets of Examples 4 to 13 using the negative active materials according to Examples 1 to 3 took shorter time for the electrolyte solution impregnation than the slurry pellets of Comparative Examples 4 to 12 using the negative active materials according to Comparative Examples 1 to 3. Accordingly, the negative active materials according to Examples 1 to 3 exhibited a much faster impregnation speed (movement speed) in the electrolyte solution and thus less battery internal resistance than the negative active materials according to Comparative Examples 1 to 3 and resultantly, were expected to improve a cycle-life retention rate.

Accordingly, when the average particle diameter (D50) of a secondary particle/the average particle diameter (D50) of a primary particle were out of the range of 1.5 to 5 (Comparative Examples 4 to 10), or when the aspect ratio of the primary particle was out of the range of 1-7 (Comparative Examples 11 and 12), impregnation of the negative active materials in an electrolyte solution was deteriorated.

Evaluation of X-Ray Diffraction Characteristics 97.5 wt % of each negative active material according to Examples 1 to 3 and Comparative Examples 1 to 3, 1.0 wt % of carboxymethyl cellulose, and 1.5 wt % of styrene-butadiene rubber were mixed in water as a solvent to prepare each negative active material slurry. The slurry was pressed as shown in Table 2 to manufacture each slurry pellet consisting of the active material and a binder. Each slurry pellet was referred to be Examples 14 to 19 and Comparative Examples 13 to 20.

TABLE 2

| | Negative active material | Pressure (ton) | Slurry pellet density (g/cc) |
|---|---|---|---|
| Comparative Example 13 | Comparative Example 1 | 1.1 | 1.36 |
| Comparative Example 14 | Comparative Example 1 | 1.79 | 1.43 |
| Comparative Example 15 | Comparative Example 1 | 2.10 | 1.55 |
| Example 14 | Example 1 | 1.50 | 1.43 |
| Example 15 | Example 1 | 4.60 | 1.66 |
| Example 16 | Example 2 | 3.00 | 1.71 |
| Example 17 | Example 2 | 4.00 | 1.83 |
| Example 18 | Example 3 | 1.00 | 1.54 |
| Example 19 | Example 3 | 1.50 | 1.68 |
| Comparative Example 16 | Comparative Example 2 | 0.75 | 1.45 |
| Comparative Example 17 | Comparative Example 2 | 1.00 | 1.56 |
| Comparative Example 18 | Comparative Example 2 | 1.50 | 1.67 |
| Comparative Example 19 | Comparative Example 3 | 0.75 | 1.47 |
| Comparative Example 20 | Comparative Example 3 | 1.00 | 1.58 |

X-ray diffraction (XRD) of the powder pellets was measured by using a CuKα ray to obtain intensity of a (002) plane and a (110) plane. Then, a peak intensity ratio, $I_{(002)}/I_{(110)}$ was calculated, and the results are shown in Table 3 and FIG. 3. In addition, the peak intensity ratio, $I_{(002)}/I_{(110)}$ and the slurry pellet density in Table 2 were used to obtain $(I_{(002)}/I_{(110)})$/slurry pellet density, and the results are shown in Table 3.

TABLE 3

| | Negative active material | $I_{(002)}/I_{(110)}$ | $[I_{(002)}/I_{(110)}]/$ slurry pellet density (cc/g) |
|---|---|---|---|
| Comparative Example 13 | Comparative Example 1 | 200 | 147.06 |
| Comparative Example 14 | Comparative Example 1 | 230 | 160.84 |
| Comparative Example 15 | Comparative Example 1 | 249 | 160.65 |
| Example 14 | Example 1 | 80 | 55.94 |
| Example 15 | Example 1 | 110 | 66.27 |
| Example 16 | Example 2 | 155 | 90.64 |

TABLE 3-continued

| | Negative active material | $I_{(002)}/I_{(110)}$ | $[I_{(002)}/I_{(110)}]/$ slurry pellet density (cc/g) |
|---|---|---|---|
| Example 17 | Example 2 | 220 | 120.22 |
| Example 18 | Example 3 | 75 | 48.70 |
| Example 19 | Example 3 | 77 | 45.83 |
| Comparative Example 16 | Comparative Example 2 | 210 | 144.83 |
| Comparative Example 17 | Comparative Example 2 | 252 | 161.54 |
| Comparative Example 18 | Comparative Example 2 | 270 | 161.68 |
| Comparative Example 19 | Comparative Example 3 | 267 | 181.63 |
| Comparative Example 20 | Comparative Example 3 | 290 | 183.54 |

As shown in FIG. 3, the pellets of Examples 14 to 19 using the negative active materials of Examples 1 to 3 showed a peak intensity ratio $I_{(002)}/I_{(110)}$ of 77 to 220 and $[I_{(002)}/I_{(110)}]$/slurry pellet density of 45.83 cc/g to 120.22 cc/g, while the pellets of Comparative Examples 13 to 20 using the negative active materials of Comparative Examples 1 to 3 showed a peak intensity ratio $I_{(002)}/I_{(110)}$ of 200 to 290 and $[I_{(002)}/I_{(110)}]$/slurry pellet density of 144.83 cc/g to 183.54 cc/g.

Accordingly, the negative active materials of Examples 1 to 3 showed improved random-orientation, that is, increased disorderness. Particularly, the negative active material of Example 3 showed the most excellent random-orientation. Accordingly, when the average particle diameter (D50) of a secondary particle/the average particle diameter (D50) of a primary particle were out of the range of 1.5 to 5 (Comparative Examples 13 to 18), or when the aspect ratio of the primary particle was out of the range of 1-7 (Comparative Examples 19 and 20), random-orientation of the negative active materials was deteriorated.

Evaluation of Rate Capability 97.5 wt % of each negative active material of Examples 1 to 3 and Comparative Examples 1 to 2, 1.0 wt % of carboxymethyl cellulose, and 1.5 wt % of styrene-butadiene rubber were mixed in water as a solvent to respectively prepare a negative active material composition. Each negative active material composition was coated on a Cu current collector to respectively manufacture a negative electrode.

Each negative electrode, a lithium metal counter electrode, and an electrolyte solution were used to respectively manufacture a coin-type half-cell in a conventional method. The electrolyte solution was prepared by dissolving 1.0 M LiPF$_6$ in a mixed solvent of ethylene carbonate and diethyl carbonate (50:50 of a volume ratio). Each half-cell was referred to be Examples 20 to 22 and Comparative Examples 21 and 23.

The half-cells were respectively once charged and discharged at 0.2 C 25° C. and then, their discharge capacities were measured. The discharge capacities are shown in Table 4.

In addition, the half-cells were charged and discharged once at 0.2 C, once at 0.5 C, once at 1.0 C, once at 2.0 C, and once at 3.0 C at 25° C., and then, their charge and discharge capacities were measured. A ratio of 0.5 C charge capacity relative to 0.2 C charge capacity, a ratio of 1.0 C charge capacity relative to 0.2 C charge capacity, and a ratio of 2.0 C charge capacity relative to 0.2 C charge capacity were calculated, and the results are shown in Table 4. In addition, a ratio of 1.0 C discharge capacity relative to 0.2 C discharge capacity, a ratio of 2.0 C discharge capacity relative to 0.2 C discharge capacity, and a ratio of 3.0 C discharge capacity relative to 0.2 C discharge capacity were calculated, and the results are shown in Table 4.

TABLE 4

| | Negative active material | Pressure (ton) | Slurry pellet density (g/cc) |
|---|---|---|---|
| Comparative Example 13 | Comparative Example 1 | 1.1 | 1.36 |
| Comparative Example 14 | Comparative Example 1 | 1.79 | 1.43 |
| Comparative Example 15 | Comparative Example 1 | 2.10 | 1.55 |
| Example 14 | Example 1 | 1.50 | 1.43 |
| Example 15 | Example 1 | 4.60 | 1.66 |
| Example 16 | Example 2 | 3.00 | 1.71 |
| Example 17 | Example 2 | 4.00 | 1.83 |
| Example 18 | Example 3 | 1.00 | 1.54 |
| Example 19 | Example 3 | 1.50 | 1.68 |
| Comparative Example 16 | Comparative Example 2 | 0.75 | 1.45 |
| Comparative Example 17 | Comparative Example 2 | 1.00 | 1.56 |
| Comparative Example 18 | Comparative Example 2 | 1.50 | 1.67 |
| Comparative Example 19 | Comparative Example 3 | 0.75 | 1.47 |
| Comparative Example 20 | Comparative Example 3 | 1.00 | 1.58 |

As shown in Table 4, the half-cells of Examples 20 to 22 using the negative active materials according to Examples 1 to 3 showed excellent charge and discharge characteristics compared with the half-cells of Comparative Examples 21 to 23 using the negative active materials according to Comparative Examples 1 to 3. Particularly, the half-cells of Examples 21 to 22 showed excellent high rate capability compared with the half-cells of Comparative Examples 21 to 23. Accordingly, when the average particle diameter (D50) of a secondary particle/the average particle diameter (D50) of the primary particle was beyond a range of 1.5 to 5 (Comparative Examples 21 and 22), or when the aspect ratio of the primary particle was beyond a range of 1 to 7 (Comparative Example 23), charge and discharge characteristics and particularly, high rate capability was deteriorated.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. A negative active material for a rechargeable lithium battery, comprising:
   a plurality of primary particles of a crystalline carbon-based material and a secondary particle, the secondary particle comprising a mixture of both an assembly of the primary particles and a binder pitch,
   wherein the crystalline carbon-based material is a needle-cokes type artificial graphite,
   wherein a ratio of an average particle diameter (D50) of the secondary particle relative to an average particle diameter (D50) of the primary particles ranges from 1.5 to 5,
   an aspect ratio of the primary particles ranges from 1 to 5, and
   wherein in an X-ray diffraction pattern of the negative active material, the $I_{(002)}/I_{(110)}$ that is a ratio of X-ray diffraction intensities of the negative active material at a (002) plane and a (110) plane and a pellet density of the negative active material have a relationship of Equation 1:

$$29 \leq [(I_{(002)}/I_{(110)})/\text{pellet density (cc/g)}] \leq 90.64, \quad \text{[Equation 1]}$$

wherein the average particle diameter (D50) of the primary particles ranges from 3 μm to 10 μm, wherein in an X-ray diffraction pattern of the negative active material, $I_{(002)}/I_{(110)}$ that is a ratio of X-ray diffraction intensities at a (002) plane and a (110) plane ranges from 50 to 270, wherein the binder pitch is coal pitch and/or petroleum pitch, and a weight ratio between the primary particles and the binder pitch of the negative active material for the rechargeable lithium battery is 5:5 to 9.9:0.1.

2. The negative active material of claim 1, wherein the average particle diameter (D50) of the primary particles ranges from 5 μm to 10 μm.

3. The negative active material of claim 1, wherein the average particle diameter (D50) of the secondary particle ranges from 10 μm to 25 μm.

4. The negative active material of claim 1, wherein the negative active material further includes a Si-based or Sn-based material.

5. The rechargeable lithium battery according to claim 1, comprising
   a negative electrode including the negative active material;
   a positive electrode including a positive active material; and
   an electrolyte.

6. The negative active material of claim 1, wherein the weight ratio between the primary particles and the binder pitch of the negative active material for the rechargeable lithium battery is 5:5 to 9:1.

* * * * *